UNITED STATES PATENT OFFICE.

EDWIN R. TALLEY, OF GRINNELL, IOWA.

ARTIFICIAL RUBBER.

1,285,463.   Specification of Letters Patent.   Patented Nov. 19, 1918.

No Drawing.   Application filed September 12, 1918.   Serial No. 253,827.

*To all whom it may concern:*

Be it known that I, EDWIN R. TALLEY, a citizen of the United States, residing at Grinnell, in the county of Poweshiek and State of Iowa, have invented certain new and useful Improvements in Artificial Rubber; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

The great and constantly increasing cost of crude rubber and the rapidly increasing consumption of rubber in the trades, make it desirable to obtain a product containing no rubber whatsoever, but which has many of the characteristics of rubber, thus rendering it suitable for use in many situations where rubber is employed.

My invention relates to an improved process of making artificial rubber, and to the improved product obtained by the process; and one of the objects is to provide a process of this nature which is simple and practical, and which will not require the utilization of special and expensive machinery.

Another important object is to provide an artificial rubber which, while possessing many of the advantages of rubber, will present certain other desirable characteristics not possessed by rubber. The characteristics of my product may be enumerated as follows:

It is soft and elastic and like vulcanized rubber it resists cold and heat changes. It resists decomposition better than rubber. It is non-inflammable, tough, tenacious and of high tensile strength. It is impervious to water, and it withstands the action of acids, alkalis and the solvents of rubber.

Another object is to provide an imitation rubber which is inexpensive to manufacture.

In carrying out my process, I first make two separate mixtures, one mixture comprising a suitable vegetable oil capable of being vulcanized (preferably maize oil), camphor, and suitable hydrocarbon resinous bodies (such as coal tar and asphaltum). These ingredients are contained in a suitable crucible, being subjected to heat sufficient to melt the ingredients. The other mixture comprises a suitable vegetable oil capable of being vulcanized (preferably linseed oil), white lead, powdered shale and ground asbestos.

I then combine the two mixtures, and heat the same to the proper temperature, preferably 350 degrees F.

When the temperature reaches 350 degrees F., I add sulfur and cook the mass one and one-half hours at the temperature of 350 degrees F., and under sixty to eighty pounds pressure of steam.

I then allow the mixture to cool, preferably by pouring the same into iron pans.

When partially cooled, I submit the mass to pressure.

As an example of proportions of the different ingredients which I have found to make a most excellent product, I give the following proportions all by weight:

Maize oil twenty-one parts; coal tar twelve parts; asphaltum twelve parts; camphor one part; linseed oil twenty-one parts; white lead four parts; powdered shale seven parts; ground asbestos seven parts, and sulfur fifteen parts.

While I do not confine myself under all circumstances to the exact proportions and degree of heat herein stated, since other relative quantities of the different ingredients and other temperatures may be used, the proportions and mode of treatment herein given have been found to make a most satisfactory product.

The following is an explanation of the reasons covering the selection of the above ingredients, as well as the purpose of the above steps in my process:

The vegetable oils are adhesive, and act most satisfactorily as binders. The oils employed are capable of vulcanization, and any oxidizable oils which are also adhesive could be employed.

The coal tar and asphaltum, while also adhesive, serve to give the product the properties of water-proofness and elasticity. The linseed oil also serves to make the product water proof. I have found by experiment that a greater amount of sulfur is required to properly vulcanize the compound if the camphor is omitted, than when the camphor is present. By the term "camphor," as used in this specification, I mean camphor, both natural and artificial, and such gums and resinous bodies as are analogous thereto.

The white lead is used for rapid vulcanization, and acts as an accelerator. The white lead also tends to prevent the product from becoming hard. It also assists in making the product water proof. It also acts as a binder, securing perfect coalition of the particles of the mass. It also gives tensile strength and toughness to the mass. It also tends to maintain the insolubility and elasticity of the mass, and increases the resistance of the product to moisture.

By experiments covering a large number of substances to be used as fillers, I have found powdered shale to be the most satisfactory and to be peculiarly adapted for this purpose, as, for one thing, it gives a maximum durability to the product. The asbestos also serves to lighten and preserve the product.

The sulfur is used, of course, to vulcanize. The term "sulfur" is used in this specification in a broad and comprehensive sense to include both sulfur alone and sulfur in any of its chemical combinations. The vulcanized oil tends to maintain the product in a permanently elastic state and prevents it from oxidizing and hardening when exposed to the atmosphere, or from continuous use.

To obtain the best results, the ingredients should be mixed separately, as stated, in two different mixtures in separate vessels before combining them, as this results in a homogeneous composition, since the mixture combines better when the coal tar, asphaltum and camphor have first been liquefied.

The degree of pressure to which the mass is finally subjected varies according to the particular purpose for which the artificial rubber is intended to be used.

It may be stated that my product is adapted, for instance, to be used as solid or so-called cushion tires for automobiles, or for buffers, or for a large number of uses to which rubber is applied.

What I claim to be new is:

1. The herein described process of making artificial rubber, consisting in compounding two separate mixtures, one mixture comprising a vulcanizable vegetable oil and resinous hydro-carbon bodies, and the other mixture comprising a vulcanizable vegetable oil and a filler, combining said mixtures, heating the same, vulcanizing, and when partially cooled subjecting the mass to pressure.

2. The herein described process of making artificial rubber, consisting in compounding two separate mixtures, one mixture comprising a vulcanizable vegetable oil, resinous hydrocarbon bodies, and camphor, and the other mixture comprising a vulcanizable vegetable oil, white lead, powdered shale and ground asbestos, combining the two mixtures, subjecting the same to heat, vulcanizing, and when partially cooled subjecting the mass to pressure.

3. The herein described process of making artificial rubber, consisting in compounding two separate mixtures, one mixture comprising a vulcanizable vegetable oil, resinous hydrocarbon bodies, and camphor, and the other mixture comprising a vulcanizable vegetable oil, white lead, powdered shale and ground asbestos, combining the two mixtures, subjecting the same to heat under a suitable pressure of steam, vulcanizing, and when partially cooled subjecting the mass to pressure.

4. A composition of matter for use in the manufacture of artificial rubber, including vulcanizable vegetable oils, resinous hydrocarbon bodies, camphor, powdered shale and sulfur.

5. A composition of matter for use in the manufacture of artificial rubber, including vulcanizable vegetable oils, resinous hydrocarbon bodies, camphor, white lead, powdered shale and sulfur.

6. A composition of matter for use in the manufacture of artificial rubber, including vulcanizable vegetable oils, resinous hydrocarbon bodies, camphor, white lead, ground asbestos, powdered shale and sulfur.

7. A composition of matter for use in the manufacture of artificial rubber, formed of a combination of the following ingredients in substantially the proportions given by weight: vegetable oil 42 parts; coal tar 12 parts; asphaltum 12 parts; camphor one part; white lead 4 parts; powdered shale 7 parts; ground asbestos 7 parts, and sulfur 15 parts.

In testimony whereof I hereunto affix my signature in presence of two witnesses.

EDWIN R. TALLEY.

Witnesses:
 WILL C. RAYBURN,
 EDITH W. KENDALL.